US012650139B2

(12) United States Patent
Ohlendorf et al.

(10) Patent No.: US 12,650,139 B2
(45) Date of Patent: Jun. 9, 2026

(54) PRESSURE LOSS GENERATING DEVICE AND USE OF THE PRESSURE LOSS GENERATING DEVICE

(71) Applicant: Glatt Ingenieurtechnik Gesellschaft mit beschränkter Haftung, Weimar (DE)

(72) Inventors: Frank Ohlendorf, Erfurt (DE); Arne Teiwes, Weimar (DE); Michael Jacob, Weimar (DE); Louis Friedrich, Bienstädt (DE)

(73) Assignee: Glatt Ingenieurtechnik Gesellschaft mit beschränkter Haftung, Weimar (DE)

( * ) Notice: Subject to any disclaimer, the term of this patent is extended or adjusted under 35 U.S.C. 154(b) by 874 days.

(21) Appl. No.: 17/916,401

(22) PCT Filed: Mar. 25, 2021

(86) PCT No.: PCT/EP2021/057705

§ 371 (c)(1),
(2) Date: Sep. 30, 2022

(87) PCT Pub. No.: WO2021/198005

PCT Pub. Date: Oct. 7, 2021

(65) Prior Publication Data

US 2023/0151832 A1     May 18, 2023

(30) Foreign Application Priority Data

Mar. 31, 2020     (DE) ..................... 10 2020 204 198.9

(51) Int. Cl.
    *F15D 1/02*     (2006.01)
    *B01J 19/10*     (2006.01)
    (Continued)

(52) U.S. Cl.
    CPC ................. *F15D 1/02* (2013.01); *B01J 19/10* (2013.01); *B01J 2/04* (2013.01); *B01J 4/001* (2013.01);
    (Continued)

(58) Field of Classification Search
    CPC ..... F15D 1/02; B01J 19/10; B01J 2219/0869; B01J 2219/0875; B01J 2219/0886;
    (Continued)

(56) References Cited

U.S. PATENT DOCUMENTS

| | | |
|---|---|---|
| 4,122,914 A | 10/1978 | Suyama |
| 4,360,076 A | 11/1982 | Suyama |

(Continued)

FOREIGN PATENT DOCUMENTS

| | | |
|---|---|---|
| CN | 204004976 U | 12/2014 |
| CN | 106704832 A | 5/2017 |

(Continued)

*Primary Examiner* — Minh Q Le
(74) *Attorney, Agent, or Firm* — The Webb Law Firm

(57) ABSTRACT

A pressure loss production device having a process gas inflow with a process gas inflow inlet, a process gas inflow outlet, a process gas inflow longitudinal center axis, and a process gas inflow cross-sectional surface, having a process gas distributor with a process gas distributor longitudinal center axis, a process gas distributor cross-sectional surface, a process gas distributor inlet arranged on a first end face and a process gas distributor outlet arranged on a second end face, and having a process gas outflow that includes a process gas outflow inlet, a process gas outflow outlet, a process gas outflow longitudinal center axis, and a process gas outflow cross-sectional surface. The process gas inflow and process gas outflow are arranged, relative to one another, in such a manner that the process gas inflow longitudinal center axis and the process gas outflow longitudinal center axis are arranged offset from one another.

13 Claims, 3 Drawing Sheets

(51) Int. Cl.

| | |
|---|---|
| *B01J 2/04* | (2006.01) |
| *B01J 4/00* | (2006.01) |
| *B01J 8/16* | (2006.01) |
| *B01J 19/24* | (2006.01) |
| *F16L 55/05* | (2006.01) |

(52) U.S. Cl.
CPC ............... *B01J 8/16* (2013.01); *B01J 19/241* (2013.01); *B01J 2219/00162* (2013.01); *B01J 2219/00164* (2013.01); *B01J 2219/0869* (2013.01); *B01J 2219/0875* (2013.01); *B01J 2219/0886* (2013.01); *F16L 55/05* (2013.01)

(58) Field of Classification Search
CPC .... B01J 2219/00162; B01J 2219/00164; B01J 4/001; B01J 8/16; B01J 19/241; B01J 2/04; F16L 55/05
USPC ....................................................... 137/87.04
See application file for complete search history.

(56) References Cited

U.S. PATENT DOCUMENTS

| | | | | |
|---|---|---|---|---|
| 4,570,745 | A | | 2/1986 | Sparks et al. |
| 5,015,171 | A | * | 5/1991 | Zinn ....................... F23C 15/00 |
| | | | | 431/1 |
| 5,107,953 | A | | 4/1992 | Shimizu et al. |
| 6,260,659 | B1 | * | 7/2001 | Takahashi ................. F01N 1/08 |
| | | | | 181/227 |
| 7,669,693 | B2 | | 3/2010 | Yamaguchi et al. |
| 9,360,145 | B2 | | 6/2016 | Sorhuus et al. |
| 12,203,463 | B2 | * | 1/2025 | Czyz .................. B60H 1/00571 |
| 2005/0262850 | A1 | * | 12/2005 | Knight .................... B01J 4/001 |
| | | | | 60/782 |
| 2015/0044105 | A1 | * | 2/2015 | Novoselov ............ B01J 19/088 |
| | | | | 422/186.04 |
| 2015/0308385 | A1 | * | 10/2015 | Foege .................... F15C 3/005 |
| | | | | 137/829 |
| 2019/0002646 | A1 | * | 1/2019 | Castaneda Zuniga ... C08J 3/226 |
| 2020/0231718 | A1 | * | 7/2020 | Lawson .................. B01J 8/005 |
| 2021/0146325 | A1 | | 5/2021 | Jacob et al. |
| 2021/0229061 | A1 | * | 7/2021 | Stowell .................. B01D 53/32 |
| 2022/0268301 | A1 | * | 8/2022 | Taghipour ............... B01J 19/24 |
| 2023/0149884 | A1 | * | 5/2023 | Ohlendorf ................. B01J 8/16 |
| | | | | 422/127 |

FOREIGN PATENT DOCUMENTS

| | | | |
|---|---|---|---|
| CN | 107557815 | A | 1/2018 |
| CN | 109945005 | A | 6/2019 |
| DE | 2713120 | A1 | 10/1977 |
| DE | 2719213 | A1 | 11/1977 |
| DE | 102004058418 | A1 | 7/2005 |
| DE | 102018205152 | A1 | 10/2019 |

* cited by examiner

PRESSURE LOSS GENERATING DEVICE AND USE OF THE PRESSURE LOSS GENERATING DEVICE

CROSS-REFERENCE TO RELATED APPLICATIONS

This application is the United States national phase of International Patent Application No. PCT/EP2021/057705 filed Mar. 25, 2021, and claims priority to German Patent Application No. 10 2020 204 198.9 filed Mar. 31, 2020, the disclosures of which are hereby incorporated by reference in their entireties.

BACKGROUND

Field

The invention relates to a pressure loss production device having a process gas inflow that has a process gas inflow inlet, a process gas inflow outlet, a process gas inflow longitudinal center axis, and a process gas inflow cross-sectional surface, having a process gas distributor that has a process gas distributor longitudinal center axis, a process gas distributor cross-sectional surface, a process gas distributor inlet arranged on a first end face and a process gas distributor outlet arranged on a second end face, and having a process gas outflow that comprises a process gas outflow inlet, a process gas outflow outlet, a process gas outflow longitudinal center axis, and a process gas outflow cross-sectional surface, wherein the process gas inflow is connected with the first end face of the process gas distributor, and the second end face of the process gas distributor is connected with the process gas outflow, in such a manner that a continuous flow path is formed.

Description of Related Art

All the components, such as valves, slides or the like, which are arranged in pipelines through which a process gas flows, for example, bring about a pressure loss. These components have been part of the state of the art for a long time.

It is a disadvantage of these components that they do not adapt to pressure variations that occur in an oscillating process gas stream.

SUMMARY

It is therefore the task of the invention to make available a pressure loss production device, wherein the pressure loss that is produced in the pressure loss production device adapts to pressure variations of an oscillating process gas stream that occur in the process gas.

This task is accomplished, in the case of a pressure loss production device of the aforementioned type, in that the process gas inflow and process gas outflow are arranged relative to one another in such a manner that the process gas inflow longitudinal center axis and the process gas outflow longitudinal center axis are arranged offset from one another. The pressure loss of the process gas stream is achieved in the pressure loss production device, in particular by means of a reduction in the flow cross-sections of process gas inflow and process gas outflow, as well as by a deflection of the process gas stream in the process gas distributor. Further possibilities for achieving the necessary pressure loss are changes in the geometry of the process gas inflow, distributor, and outflow or an increase in the length expanse of the aforementioned components. The advantage of the pressure loss production device is that the pressure loss produced in the pressure loss production device adapts to pressure variations that occur, for example of a resonance pressure amplitude, of an oscillating process gas stream.

According to an advantageous embodiment of the pressure loss production device in this regard, the process gas inflow longitudinal center axis, the process gas outflow longitudinal center axis, and the process gas distributor longitudinal center axis are arranged in a common reference plane that stands normal to the reference plane. In this way it is ensured, in a very simple manner, that the process gas stream that flows through the pressure loss production device experiences a deflection in the pressure loss production device.

According to an additional advantageous further development of the pressure loss production device, the process gas inflow longitudinal center axis lies at a higher height level than the process gas outflow longitudinal center axis in a position of use of the pressure loss production device.

According to a further advantageous embodiment of the pressure loss production device, the process gas inflow cross-sectional surface and the process gas outflow cross-sectional surface are arranged on opposite sides of a reference plane that contains the process gas distributor longitudinal center axis. In this way, it is ensured that the process gas stream that flows through the pressure loss production device experiences a deflection in the pressure loss production device.

In a preferred pressure loss production device, a distance between the process gas inflow longitudinal center axis and the process gas outflow longitudinal center axis projected onto the first or second end face of the process gas distributor is greater than or equal to the sum of the process gas inflow radius and the process gas outflow radius. In this way, it is guaranteed that a deflection of the process gas takes place in the pressure loss production device.

According to an additional advantageous further development of the pressure loss production device, the process gas inflow cross-sectional surface is greater than or equal to the process gas outflow cross-sectional surface. In this way, the process gas stream experiences a first deflection and a reduction in the process gas velocity during the transition from the process gas inflow to the process gas distributor, and subsequently a second deflection and an increase in the process gas velocity during the transition from the process gas distributor to the process gas outflow.

According to another advantageous further development of the pressure loss production device, the process gas inflow cross-sectional surface and the process gas outflow cross-sectional surface are configured to be circular. As a result, the possibility exists of producing the pressure loss production device in a simple manner, by means of the use of cylindrical pipe pieces that have different cross-sectional surfaces.

In the pressure loss production device, according to an additional advantageous embodiment, a process gas inflow outlet surface and a process gas distributor inlet surface are configured to have the same size and to be congruent and/or a process gas distributor outlet surface and a process gas outflow inlet surface are configured to have the same size and to be congruent. As a result, process gas does not back up in the transition regions between process gas inflow and process gas distributor or between process gas distributor and process gas outflow, so that the process gas stream experiences only the necessary pressure loss.

The pressure loss production device is furthermore characterized in that a diffuser is arranged between the process gas inflow and process gas distributor and/or that a nozzle is arranged between the process gas distributor and process gas outflow. Preferably the diffuser widens continuously in the flow direction of the process gas and/or the nozzle narrows continuously in the flow direction of the process gas. Furthermore preferably, the diffuser and the nozzle have different lengths in their corresponding longitudinal center axis. By means of the inclusion of a diffuser between process gas inflow and process gas distributor or of a nozzle between process gas distributor and process gas outflow, the kinetic energy of the process gas stream is converted to pressure energy or vice versa, wherein such a conversion preferably takes place by means of continuous widening of the flow cross-section. This can be implemented geometrically in different ways, for example by means of a diffuser that is configured conically or in the shape of a trumpet bell or a nozzle that is configured conically or in the shape of a trumpet bell.

According to an additional advantageous embodiment of a preferred pressure loss production device, the pressure loss production device, in particular the process gas distributor, is configured as a cavity. The pressure loss production device is thereby configured to be hollow on the inside, i.e., the inside is empty and no filter element or the like, for example, is arranged in it.

The pressure loss production device is particularly preferably used in a reactor system for the production and/or treatment of particles in an oscillating, preferably hot process gas stream, in particular a pulsation reactor. An advantage of this is that the pressure loss production device geometrically limits the system that is capable of oscillation or oscillates in the operating state. The more limited the system, the more effective production and propagation of a resonance oscillation in the system will be. The pressure loss in the pressure loss production device occurs in that the pressure loss production device, as part of the reactor system, also experiences excitation due to the excitation of the reactor system, which is configured as an acoustic resonator, so that in the operating state, the pressure loss production device effectively prevents production and propagation that goes beyond the system, in the oscillating system.

BRIEF DESCRIPTION OF THE DRAWINGS

The terms Fig., Figs., Figure, and Figures are used interchangeably in the specification to refer to the corresponding figures in the drawings.

In the following, the invention will be explained in greater detail using the attached drawing, which shows, in FIG. 1 a sectional representation of a first embodiment of a preferred pressure loss production device, FIG. 2 a top view of the reference plane D, oriented normal to the process gas inflow longitudinal center axis, of the first embodiment of the preferred pressure loss production device, FIG. 3 a sectional representation of a second embodiment of a preferred pressure loss production device, FIG. 4 a top view of the reference plane D, oriented normal to the process gas inflow longitudinal center axis, of the second embodiment of the preferred pressure loss production device, FIG. 5 a sectional representation of a third embodiment of a preferred pressure loss production device, and FIG. 6 a schematic representation of a reactor system that uses the pressure loss production device, which system is configured as an oscillating system.

DETAILED DESCRIPTION

Figure 1:
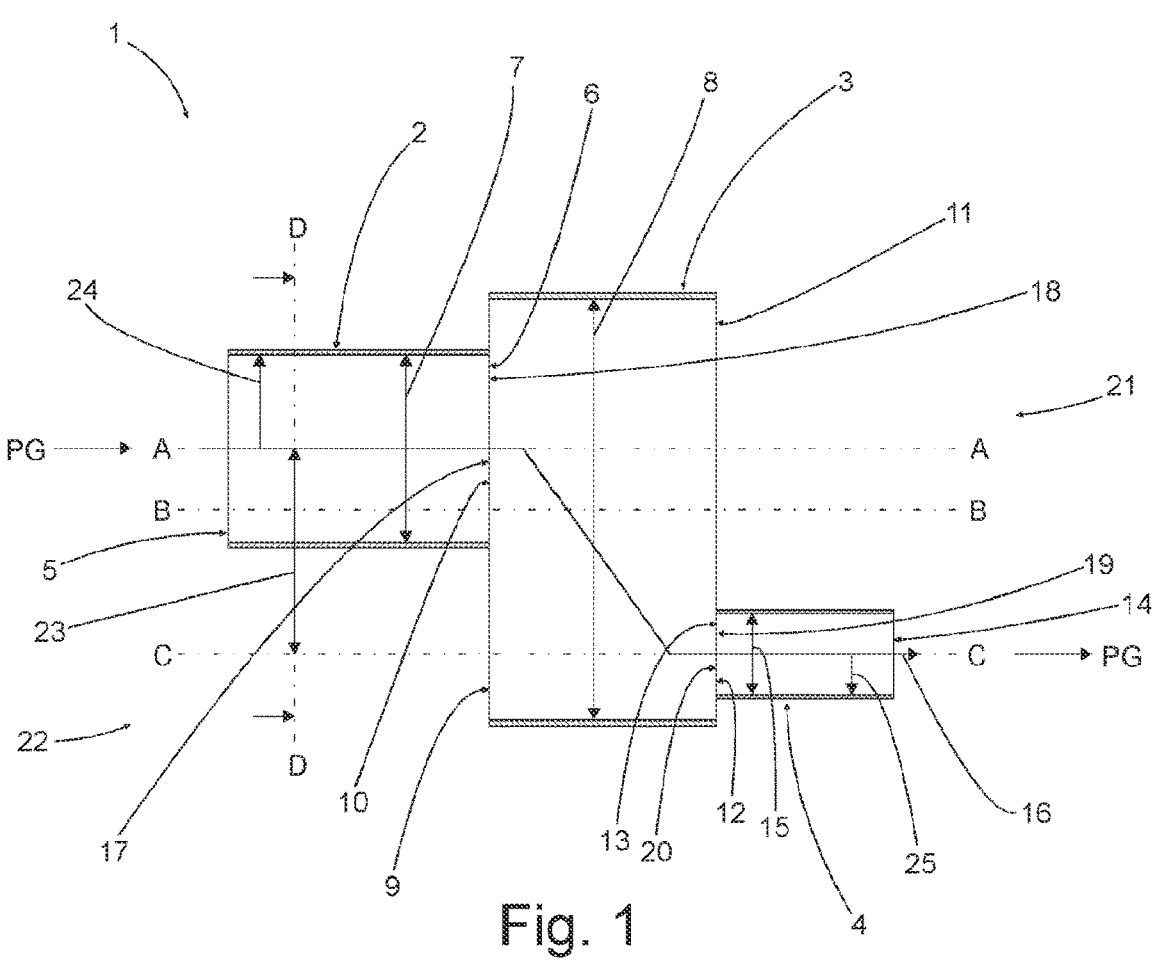

Unless a statement to the contrary is made, the following description relates to all of the embodiments of a pressure loss production device 1 according to the invention that are illustrated in the drawing.

The pressure loss production device 1 comprises a process gas inflow 2, a process gas distributor 3, and a process gas outflow 4. In the embodiments, process gas inflow 2, process gas distributor 3, and process gas outflow 4 are configured as cylindrical pipe pieces that have different cross-sectional surfaces. In other embodiments, not illustrated, process gas inflow 2, process gas distributor 3, and process gas outflow 4 are produced from other pipe pieces that are not configured to be cylindrical.

The process gas inflow 2 has a process gas inflow inlet 5, a process gas inflow outlet 6, a process gas inflow longitudinal center axis A-A, and a process gas inflow cross-sectional surface 7.

The process gas distributor 3 has a process gas distributor longitudinal center axis B-B, a process gas distributor cross-sectional surface 8, a process gas distributor inlet 10 arranged on a first end face 9, and a process gas distributor outlet 12 arranged on a second end face 11.

The process gas outflow 4 comprises a process gas outflow inlet 13, a process gas outflow outlet 14, a process gas outflow longitudinal center axis C-C, and a process gas outflow cross-sectional surface 15.

The process gas inflow 4 is connected with the first end face 9 of the process gas distributor 3, and the second end face 11 of the process gas distributor 3 is connected with the process gas outflow 4, in such a manner that a continuous flow path 16 through the pressure loss production device 1 is formed.

Furthermore, the process gas inflow 2 and process gas outflow 4 are arranged relative to one another in such a manner that the process gas inflow longitudinal center axis A-A and the process gas outflow longitudinal center axis C-C are arranged offset from one another.

It is advantageous if the pressure loss production device 1, in particular the process gas distributor 3, is configured as a cavity 30, so that the pressure loss production device 1 is empty. This result is achieved in that the pressure loss production device 1 does not have any fittings.

In FIG. 1, a sectional representation of a first embodiment of a preferred pressure loss production device 1 is shown. In a preferred position of use of the pressure loss production device 1, the process gas inflow longitudinal center axis A-A lies at a higher height level than the process gas outflow longitudinal center axis C-C. Since the pressure loss production device 1 can rotate about the process gas distributor longitudinal center axis B-B, here the term "height level" does not mean the geodetic height, but rather, in particular, a distance between the process gas inflow longitudinal center axis A-A and process gas outflow longitudinal center axis C-C.

In the embodiment shown, the process gas inflow cross-sectional surface 7 and the process gas outflow cross-sectional surface 15 are configured to be circular, wherein the process gas inflow cross-sectional surface 7 is greater than the process gas outflow cross-sectional surface 15. Furthermore, a process gas inflow outlet surface 17 and a process gas distributor inlet surface 18, as well as a process gas distributor outlet surface 19 and a process gas outflow inlet surface 20 are configured to have the same size and be congruent. As a result, the process gas stream experiences a first deflection during the transition from the process gas inflow 2 to the process gas distributor 3, and a reduction in the process gas velocity and subsequently a second deflection and an increase in the process gas speed at the transition from the process gas distributor 3 to the process gas outflow 4. The process gas PG experiences a pressure loss in this regard.

Figure 2:
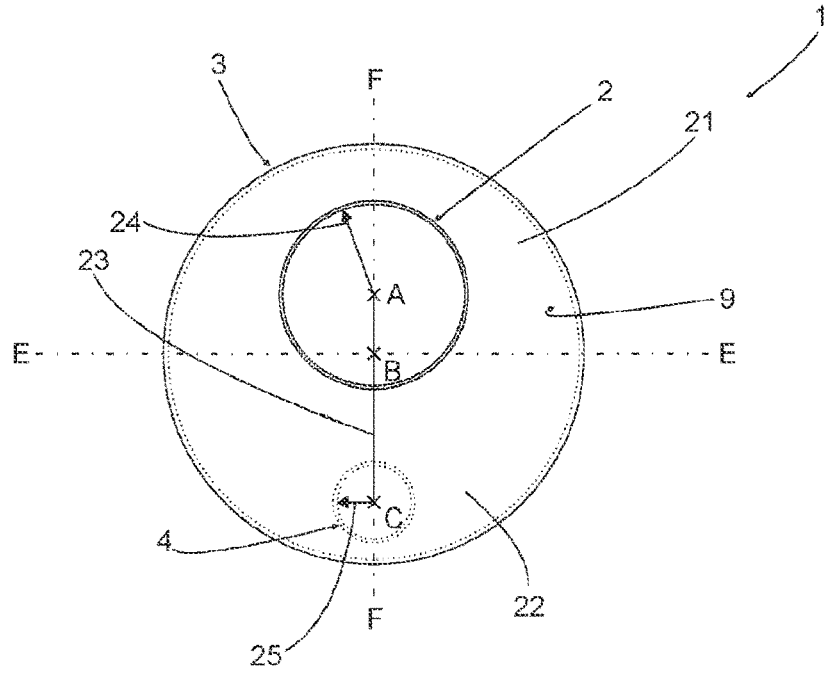

FIG. 2 shows a top view of the reference plane D, oriented normal to the process gas inflow longitudinal center axis A-A, of the first embodiment of the preferred pressure loss production device 1.

In the pressure loss production device 1, shown in a first embodiment, the process gas inflow longitudinal center axis A-A and the process gas outflow longitudinal center axis B-B are arranged on opposite sides 20, 21 of a reference plane E that contains the process gas distributor longitudinal center axis B-B. The placement on different sides 20, 21 leads to a flow deflection of the process gas PG, and thereby produces a pressure loss in the pressure loss production device 1.

Furthermore, the process gas inflow longitudinal center axis A-A, the process gas outflow longitudinal center axis C-C, and the process gas distributor longitudinal center axis B-B are arranged in a reference plane F that stands normal to the reference plane E.

A distance 23 between the process gas inflow longitudinal center axis A-A and the process gas outflow longitudinal center axis C-C, projected onto the first end face 9 of the process gas distributor 3, is greater than or equal to the sum of the process gas inflow radius 24 and process gas outflow radius 25. In this way, it is ensured that the process gas PG experiences at least one deflection on the flow path 16 through the pressure loss production device 1.

Figure 3:
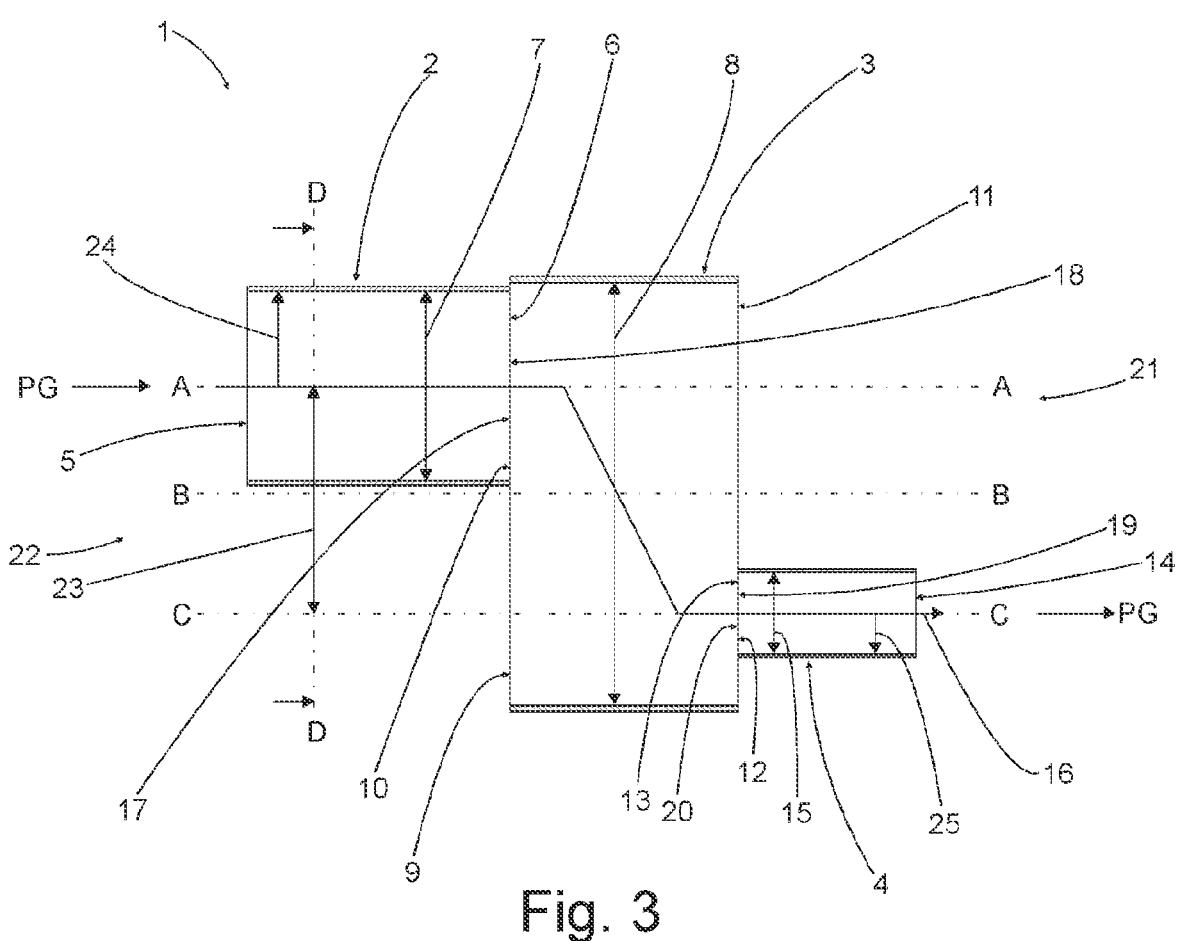
Figure 4:
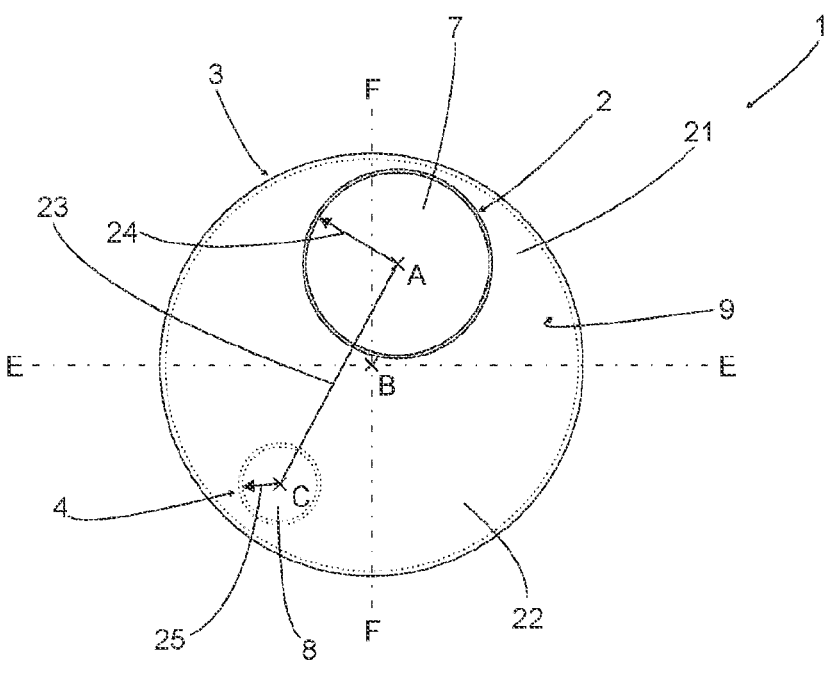

The second embodiment of a preferred pressure loss production device 1 shown in FIGS. 3 and 4 has the following differences as compared with the first embodiment.

The process gas inflow cross-sectional surface 7 and the process gas outflow cross-sectional surface 15 are arranged on opposite sides 21, 22 of a reference plane E that contains the process gas distributor longitudinal center axis B-B. In this way, too, it is possible to achieve a flow deflection of the process gas PG.

Furthermore, the process gas inflow longitudinal center axis A-A and the process gas outflow longitudinal center axis C-C are arranged in a common reference plane F that stands normal to the reference plane E. In this way, too, a deflection of the process gas on its flow path 16 through the pressure loss production device 1 is ensured.

It is practical if a reactor system 31 for the production and/or treatment of particles in an oscillating process gas stream, in particular a pulsation reactor, has the pressure loss production device 1. The pressure loss production device 1 is configured with a process gas inflow 2 that has a process gas inflow inlet 5, a process gas inflow outlet 6, a process gas inflow longitudinal center axis A-A, and a process gas inflow cross-sectional surface 7, with a process gas distributor 3 that has a process gas distributor longitudinal center axis B-B, a process gas distributor cross-sectional surface 8, a process gas distributor inlet 10 arranged on a first end face 9, and a process gas distributor outlet 12 arranged on a second end face 11, and with a process gas outflow 4 comprising a process gas outflow inlet 13, a process gas outflow outlet 14, a process gas outflow longitudinal center axis C-C, and a process gas outflow cross-sectional surface 15, wherein the process gas inflow 2 is connected with the first end face 9 of the process gas distributor 3, and the second end face 11 of the process gas distributor 3 is connected with the process gas outflow 4, in such a manner that a continuous flow path 16 is formed, characterized in that the process gas inflow 2 and process gas outflow 4 are arranged, relative to one another, in such a manner that the process gas inflow longitudinal center axis A-A and the process gas outflow longitudinal center axis C-C are arranged offset from one another.

Preferably the pressure loss production device 1 of the reactor system 31 is configured in accordance with one of claims 2 to 13.

Figure 5:
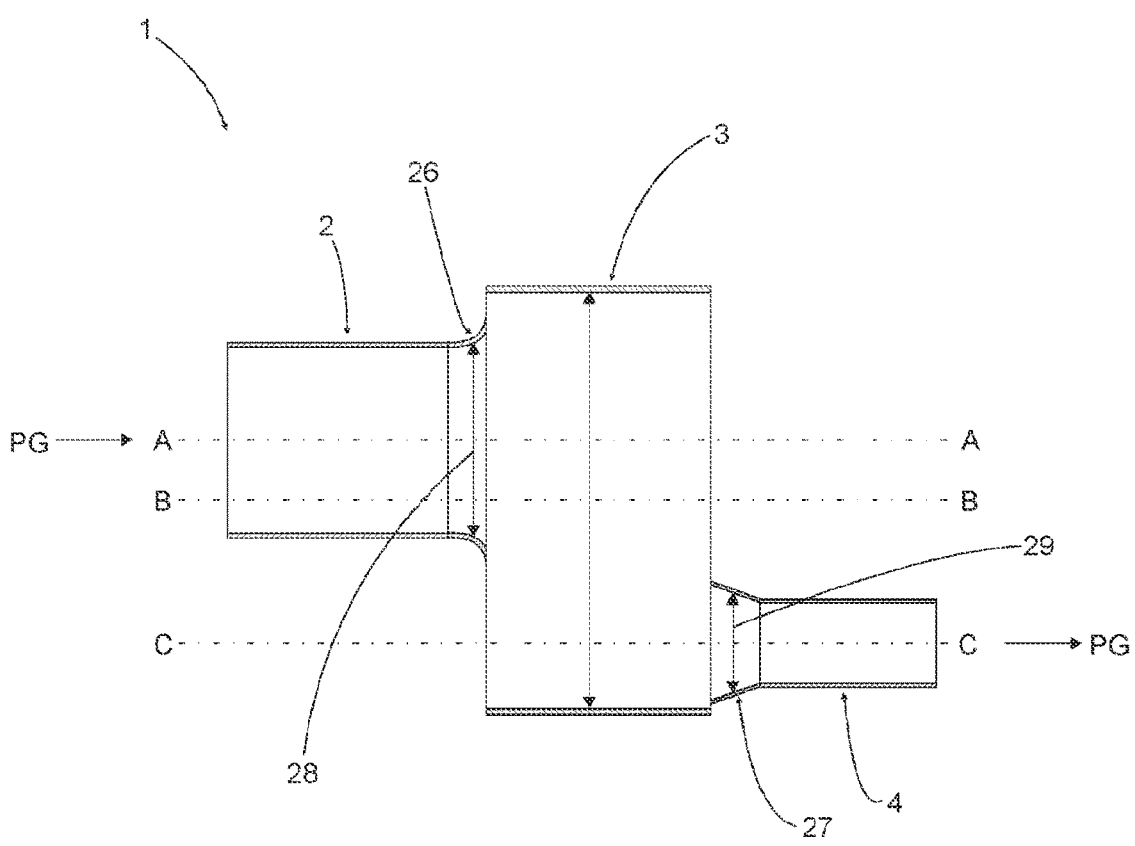

In FIG. 5, a sectional representation of a third embodiment of a preferred pressure loss production device 1 is shown.

In the third embodiment of the pressure loss production device 1, a diffuser 26 is arranged between the process gas inflow 2 and process gas distributor 3, and a nozzle 27 is arranged between the process gas distributor 3 and process gas outflow 4.

The pressure loss production device is characterized, according to claim 10 or 11, in that the diffuser and nozzle have a different length in terms of their corresponding longitudinal center axis.

By means of the diffuser 26, the kinetic energy of the process gas stream is converted to pressure energy, wherein a continuous widening of a diffuser cross-section 28, in the shape of a trumpet bell, takes place in the diffuser 26. In contrast to this, the pressure energy is converted to kinetic energy of the process gas stream by means of the nozzle 27, wherein a continuous conical widening of a nozzle cross-section 29 takes place in the nozzle 27. This widening can also be implemented geometrically in a different way, and in the process adapts to the three-dimensional shape of the corresponding components, the process gas inflow 2, process gas distributor 3, and process gas outflow 4 of the pressure loss production device 1.

The preferred pressure loss production device 1 finds use in a reactor system 31 for the production and/or treatment of particles in an oscillating process gas stream, in particular a pulsation reactor. Preferably a pressure loss production device 1 according to one of claims 1 to 13 finds use in a reactor system 31.

The reactor system 31 has a reactor unit 32, which is preceded by a process gas feed unit 33 and followed by a process gas discharge unit 34.

The reactor system 31 comprises a process gas conveying device 35 and a heating device 36. The process gas PG that flows through the reactor system 31 enters into the reactor system 31 by way of the process gas feed unit 33, and is conveyed through the reactor system 31 by means of the process gas conveying device 35.

Figure 6:
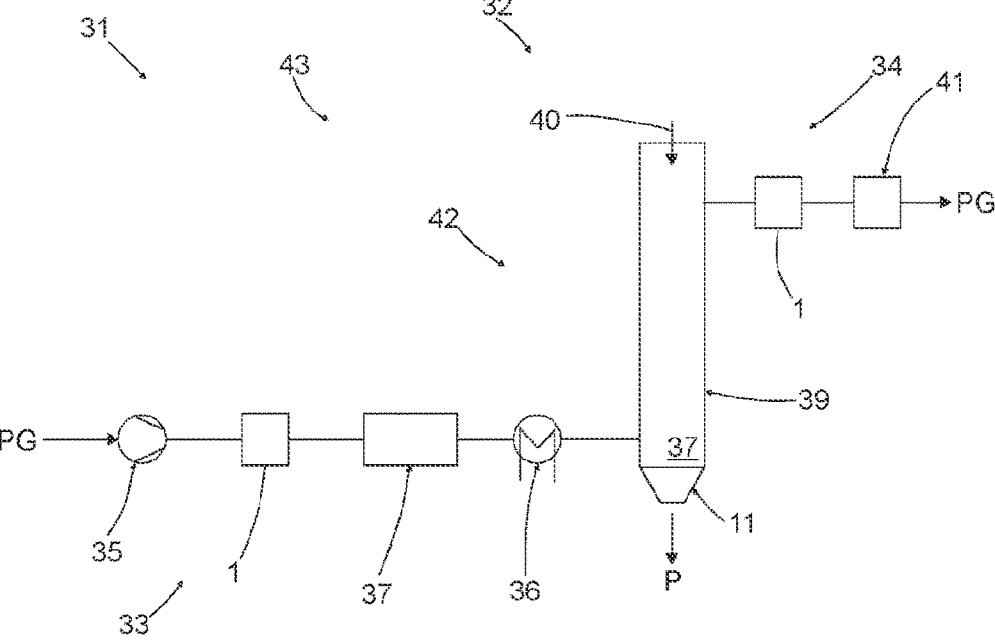

The process gas conveying device 35 is configured, for example, in particular as a radial ventilator, blower or compressor. The process gas conveying device 35 can be arranged, in particular, in the process gas feed unit 33, the process gas discharge unit 34 or, alternatively, both in the process gas feed unit 33 and in the process gas discharge unit 34. In the embodiments shown in FIG. 6, placement of the process gas conveying device 35 in the process gas feed unit 33 is shown. The placement of the process gas conveying device 35 is adapted to the conditions to be set in the reactor system 31, in particular with regard to shape, mass, and density of the starting substance.

The heating device 36 can be arranged upstream or downstream from a pulsation device 37. Placement upstream from the pulsation device 37 is preferred, since the heating device 36 does not damp a resonance pressure amplitude in the reactor system 31 in such an arrangement. Placement downstream from the pulsation device 37 is disclosed in the embodiment shown in FIG. 6. The arrangement of the heating device 36 determines the assignment of the heating device 36 to the reactor unit 32 or to the process gas feed unit 33. A heating device 36 arranged upstream from the pulsation device 37 is assigned to the process gas feed unit 33, while a heating device 36 arranged downstream from the pulsation device 37 is assigned to the reactor unit 32. In the embodiment shown, the heating device 36 is therefore assigned to the reactor unit 32.

Preferably the heating device 36 is configured as a convective gas heater, an electric gas heater, a plasma heater, a microwave heater, an induction heater or as a radiation heater. Less preferably the heating device 36 is configured as a burner that has a flame.

The process gas PG that flows through the reactor system 31 is warmed or heated to a production and/or treatment temperature by means of the heating device 36. The temperature for the production or thermal treatment of the at least one starting substance is preferably between 100° C. and 3000° C., preferably 240° C. to 2200° C., particularly preferably 240° C. to 1800° C., very particularly preferably 650° C. to 1800° C., most preferably 700° C. to 1500° C.

A pulsation that has a pulsation frequency and a pulsation pressure amplitude is imposed on the process gas PG that flows through the reactor system 31, by means of the pulsation device 36. The pulsation preferably has a pulsation pressure amplitude of 0.1 mbar to 350 mbar, particularly preferably of 1 mbar to 200 mbar, very particularly preferably of 3 mbar to 50 mbar, most preferably of 10 mbar to 40 mbar.

The pulsation frequency of the process gas PG can be set independently of the pulsation pressure amplitude. The pulsation frequency of the pulsating process gas PG that flows through the reactor system 31 on the basis of the pulsation device 37 can also be adjusted, preferably in the frequency range from 1 Hz to 2000 Hz, preferably between 1 Hz to 500 Hz, particularly preferably between 40 Hz and 160 Hz.

The pulsation device 37 is configured as a pulsation device 37 that works without a flame. It is practical if the pulsation device 37 is configured as a compression module, in particular as a piston, or as a rotary vane or as a modified turnstile.

Downstream from the process gas feed unit 33, the reactor 39 that has a reaction space 38 and is assigned to the reactor unit 32 is configured. In the reaction space 38 of the reactor 39, the starting substance is introduced into the pulsating process gas PG that flows through the reactor system 31 and the reactor 39, by means of an application device 40.

The application device 40 is preferably configured for the introduction of liquids or solids into the reaction space 38 of the reactor 39.

Liquids or liquid raw materials (precursors) can be introduced into the reaction space 38, preferably as a solution, suspension, melt, emulsion or as a pure liquid. The introduction of the liquid raw materials or liquids preferably takes place continuously. For the introduction of liquids into the reaction space 38 of the reactor 39 of the reactor unit 32, an application device 40 is preferably used, such as, for example, spray nozzles, feed pipes or droplet dispensers, which are configured, for example, as single-substance or multi-substance nozzles, pressure nozzles, nebulizers (aerosol) or ultrasound nozzles.

In contrast to this, for the introduction of solids, for example powders, granulates or the like, into the reactor 39, preferably into the reaction space 38 of the reactor 39, an application device 40 is preferably used, such as, for example, a double flap, a rotary feeder, a batching valve or an injector.

The introduction of the starting substance in the form of a liquid or of a solid can take place in or counter to the flow direction of the process gas PG that flows through the reactor system 31. In the embodiment shown in FIG. 6, application of the starting substance takes place counter to the flow direction of the process gas PG.

Preferably the starting substance is introduced into the reactor system 31, preferably into the reaction space 38 of the reactor 39, using a carrier gas. The decision as to whether the starting substance is introduced into the reactor system 31 in or counter to the flow direction of the process gas PG depends decisively on the shape, mass, and density of the starting substance at a set average flow speed of the process gas PG. As a result, the possibility exists of also thermally treating starting substances that cannot be transported in the reactor system 31 by means of the process gas PG.

The starting substance is treated thermally in the treatment zone of the reactor 39, preferably in the reaction space 38, so that the particles P to be produced, preferably the inorganic or organic nano-particles, particularly preferably the nano-crystalline metal oxide particles, are formed. The region in which the starting substances are treated thermally is defined as the treatment zone.

The process gas discharge unit 34 that follows the reactor unit 32 comprises a separation device 41. The separation device 41, in particular a filter, preferably a hot gas filter, very particularly preferably a tubular, metal or fiberglass filter, a cyclone or a washer, separates the thermally treated particles P from the pulsating, hot process gas stream that flows through the reactor system 31. The particles P that are removed from the process gas stream are drawn off from the separation device 41 and processed further. If necessary, the particles P that have been thermally treated in the reactor system 31 are subjected to further subsequent treatment steps, such as, for example, suspension, grinding or calcination. The non-charged process gas PG is conducted away into the environment.

The dwell time of the one starting substance introduced into the reactor system 31, in particular into the reaction space 38 of the reactor 39, lies between 0.1 s and 25 s. Closed-cycle operation of the process gas PG is possible. If applicable, partial removal of the process gas PG from the circuit is also possible.

Furthermore, the reactor system 31, which has a static process gas pressure, is configured as an acoustic resonator 42, which has inherent resonance frequencies that each define a resonance state. The process gas PG can form a gas column that is capable of resonance in the reactor system 31, so that the resonator 42 can be excited by means of the pulsation frequency and/or the pulsation pressure amplitude of the pulsation that is generated by means of the pulsation device 37, and in the resonance state, the pulsation can be amplified to produce a resonance oscillation of the process gas PG that has a resonance frequency and a resonance pressure amplitude.

The process gas feed unit 33 and the process gas discharge unit 34 each comprise a pressure loss production device 1 that produces a pressure loss, wherein the pressure loss production devices 1 are configured in such a manner that optionally one of the resonance states of the resonator 42 can be set. The pressure loss production devices 1 limit a system 43 of the reactor system 31 that is capable of oscillation and oscillates in the operating state, geometrically and with regard to the process gas volume of the gas column that is formed and is capable of resonance. The pressure loss production devices 1 thereby prevent propagation of the resonance oscillation beyond the pressure loss production devices 1. The more limited the system 43 is, which is capable of oscillation or oscillates in the operating state, the more effective production and propagation of the resonance oscillation in the system 43 will be.

The pressure loss production devices 1 are arranged in the reactor system 31, in particular in the process gas feed unit 33 and the process gas discharge unit 34, so that their respective positions can be changed, wherein in the operating state, the pressure loss production devices 1 cannot be changed in terms of their position, which has previously been set. In this way, it is ensured that the system 43, which oscillates in the operating state, does not change.

The pulsation device 37 of the reactor system 31 is configured for adapting the pulsation frequency and/or the pulsation pressure amplitude of the pulsation to one of the inherent resonance frequencies of the resonator 42, in such a manner that the selected resonance state can be achieved. Particularly preferably, the pulsation frequency or a whole-number multiple of it is set close to the resonance frequency of the resonator 42, so that the resonator 42 is excited and a resonance oscillation occurs in the system 43, which is capable of oscillation. By means of imposing a periodic pulsation onto the process gas PG, wherein in particular the pulsation frequency or a whole-number multiple of it is set close to the resonance frequency of the resonator 42, in a targeted manner, amplification of the resonance oscillation of the process gas PG, which has a resonance frequency and a resonance pressure amplitude, is achieved. In this way, the heat transfer and material transfer properties of the preferably hot process gas PG in the reactor system 31 are improved.

The invention claimed is:

1. A pressure loss production device, comprising:
   a process gas inflow that has a process gas inflow inlet, a process gas inflow outlet, a process gas inflow longitudinal center axis, and a process gas inflow cross-sectional surface;
   a process gas distributor that has a process gas distributor longitudinal center axis, a process gas distributor cross-sectional surface, a process gas distributor inlet arranged on a first end face and a process gas distributor outlet arranged on a second end face; and
   a process gas outflow that comprises a process gas outflow inlet, a process gas outflow outlet, a process gas outflow longitudinal center axis, and a process gas outflow cross-sectional surface,
   wherein the process gas inflow is connected with the first end face of the process gas distributor, and the second end face of the process gas distributor is connected with the process gas outflow, in such a manner that a continuous flow path is formed,
   wherein the process gas inflow and process gas outflow are arranged, relative to one another, in such a manner that the process gas inflow longitudinal center axis and the process gas outflow longitudinal center axis are arranged offset from one another, and wherein the process gas inflow cross-sectional surface is greater than the process gas outflow cross-sectional surface.

2. The pressure loss production device according to claim 1, wherein the process gas inflow longitudinal center axis and the process gas outflow longitudinal center axis are arranged on opposite sides of a reference plane that contains the process gas distributor longitudinal center axis.

3. The pressure loss production device according to claim 1, wherein the process gas inflow longitudinal center axis, the process gas outflow longitudinal center axis, and the process gas distributor longitudinal center axis are arranged in a common reference plane that stands normal to the reference plane.

4. The pressure loss production device according to claim 1, wherein in a position of use of the pressure loss production device, the process gas inflow longitudinal center axis lies at a higher height level than the process gas outflow longitudinal center axis.

5. The pressure loss production device according to claim 1, wherein the process gas inflow cross-sectional surface and the process gas outflow cross-sectional surface are arranged on opposite sides of a reference plane that contains the process gas distributor longitudinal center axis.

6. The pressure loss production device according to claim 1, wherein a distance between the process gas inflow longitudinal center axis and the process gas outflow longitudinal center axis, projected onto the first or second end face of the process gas distributor, is greater than or equal to the sum of the process gas inflow radius and process gas outflow radius.

7. The pressure loss production device according to claim 1, wherein the process gas inflow cross-sectional surface and the process gas outflow cross-sectional surface are configured to be circular.

8. The pressure loss production device according to claim 1, wherein a process gas inflow outlet surface and a process gas distributor inlet surface are configured to have the same size and be congruent and/or a process gas distributor outlet surface and a process gas outflow inlet surface are configured to have the same size and be congruent.

9. The pressure loss production device according to claim 1, wherein a diffuser adapted to convert kinetic energy of a process gas stream to pressure energy is arranged between the process gas inflow and process gas distributor and/or a nozzle adapted to convert pressure energy of the process gas stream to kinetic energy is arranged between the process gas distributor and process gas outflow.

10. The pressure loss production device according to claim 9, wherein the diffuser widens continuously in the flow direction of the process gas and/or the nozzle narrows continuously in the flow direction of the process gas.

11. The pressure loss production device according to claim 9, wherein the diffuser and nozzle have a different length in their corresponding longitudinal center axis.

12. The pressure loss production device according to claim 1, wherein the pressure loss production device is configured as a cavity.

13. A method for the production and/or treatment of particles in an oscillating process gas stream in a reactor system, the reactor system comprising a pressure loss production device, the pressure loss production device having a process gas inflow that has a process gas inflow inlet, a process gas inflow outlet, a process gas inflow longitudinal center axis, and a process gas inflow cross-sectional surface, having a process gas distributor that has a process gas distributor longitudinal center axis, a process gas distributor cross-sectional surface, a process gas distributor inlet arranged on a first end face and a process gas distributor outlet arranged on a second end face, and having a process gas outflow that comprises a process gas outflow inlet, a process gas outflow outlet, a process gas outflow longitudinal center axis, and a process gas outflow cross-sectional surface, wherein the process gas inflow is connected with the first end face of the process gas distributor, and the second end face of the process gas distributor is connected with the process gas outflow, in such a manner that a continuous flow path is formed wherein the process gas inflow and process gas outflow are arranged, relative to one another, in such a manner that the process gas inflow longitudinal center axis and the process gas outflow longitudinal center axis are arranged offset from one another, and wherein the process gas inflow cross-sectional surface is greater than the process gas outflow cross-sectional surface, the method comprising:

passing the process gas stream through the process gas inflow of the pressure loss production device.

\* \* \* \* \*